United States Patent [19]

Wilkinson

[11] Patent Number: 5,416,601
[45] Date of Patent: May 16, 1995

[54] CONTROLLING VIDEO REPLAY STORES

[75] Inventor: James H. Wilkinson, Tadley, United Kingdom

[73] Assignee: Sony United Kingdom, Ltd., Staines, United Kingdom

[21] Appl. No.: 307,395

[22] Filed: Sep. 16, 1994

Related U.S. Application Data

[63] Continuation of Ser. No. 94,427, Jul. 21, 1993, abandoned.

[30] Foreign Application Priority Data

Aug. 21, 1992 [GB] United Kingdom ............... 9217840

[51] Int. Cl.6 ............................................. H04N 5/76
[52] U.S. Cl. ..................................... 358/335; 358/312
[58] Field of Search ............... 358/335, 312, 310, 339; 360/10.1, 33.1, 32

[56] References Cited

U.S. PATENT DOCUMENTS

| | | | |
|---|---|---|---|
| 4,698,698 | 10/1987 | Collins | 360/10.1 |
| 4,751,589 | 6/1988 | Kominami et al. | |
| 4,803,567 | 2/1989 | Wilkinson | 360/33.1 |
| 5,247,400 | 9/1993 | Asai | 358/335 |

Primary Examiner—Huy Nguyen
Attorney, Agent, or Firm—William S. Frommer; Alvin Sinderbrand

[57] ABSTRACT

A video replay store controller wherein appropriate ones of a plurality of field stores are selected for storing replayed video data in a digital video tape recorder (DVTR). The controller comprises a transition detector associated with each of a plurality of video replay heads, for detecting changes in field identifiers associated with consecutively replayed video data blocks received from that video replay head, thereby detecting a field transition in the data replayed by that video replay head.

17 Claims, 9 Drawing Sheets

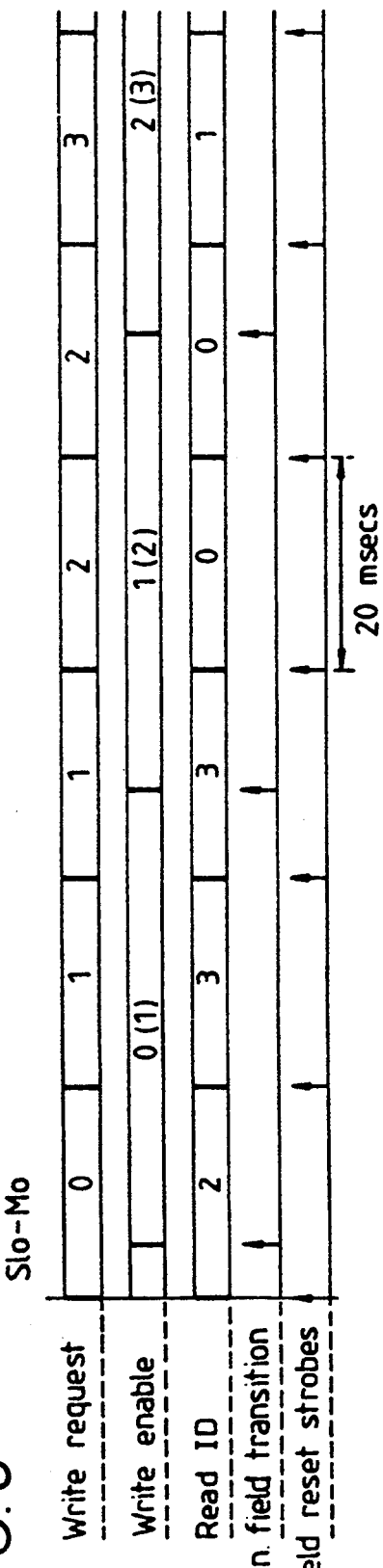
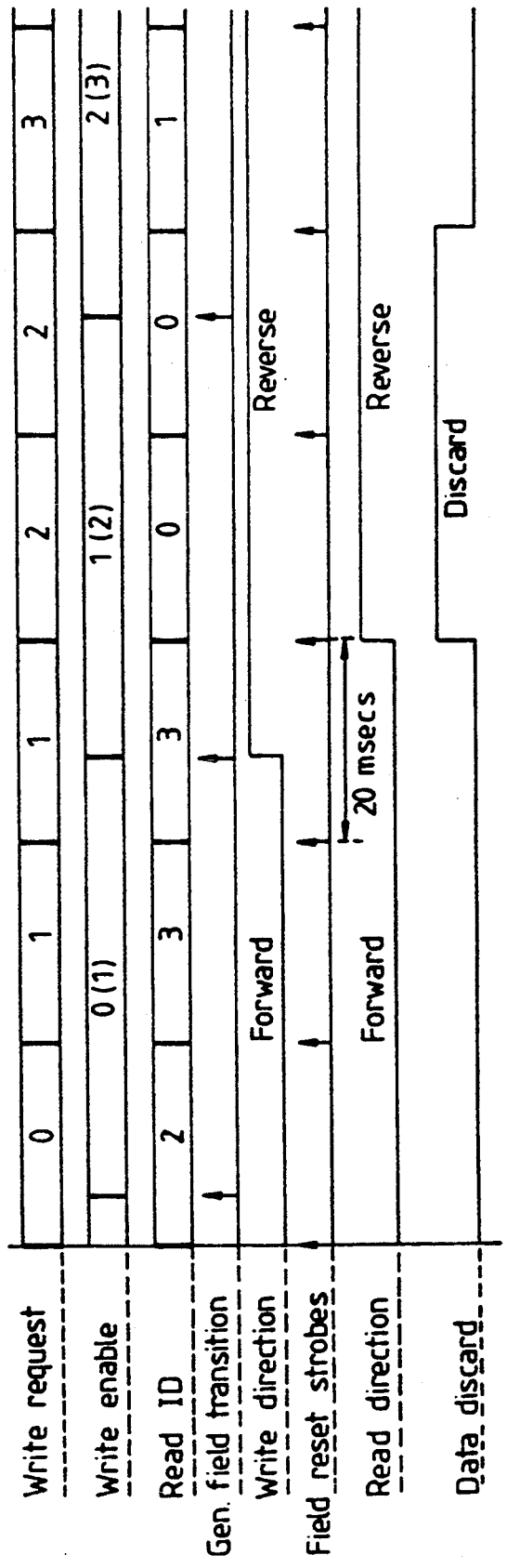
FIG. 8
FIG. 9

CONTROLLING VIDEO REPLAY STORES

This application is a continuation of application Ser. No. 08/094,427, filed Jul. 21, 1993 now abandoned.

BACKGROUND OF THE INVENTION

1. Field of the Invention

This invention relates to controlling video replay stores.

2. Description of the Prior Art

A video replay store controller is used in a video record/replay apparatus such as a digital video tape recorder (DVTR) to control the writing and reading of a replayed video signal to and from a multi-field replay buffer store. A previously proposed DVTR employing this arrangement is shown in the accompanying FIG. 1, in which blocks of replayed video data are supplied from a helical scanning tape transport mechanism 10, via a channel decoder 20, to a replay store 30.

The channel decoder provides synchronisation of the replayed data blocks, conversion from serial to parallel format, checking of identification data included in each data block, and a first level of error detection and correction.

The replay store 30 comprises four single-field stores, which are numbered 0 to 3 in FIG. 1. As each video field is replayed by the tape transport mechanism 10, it is stored in a field store selected by a store controller 40 according to a predetermined cyclic access sequence. Similarly, video fields for output by the DVTR are read out of a replay store selected by the store controller 40 according to the same cyclic access sequence. The multi-field replay store 30 is used as a buffer to allow asynchronously replayed video data to be processed and output by the DVTR at a constant and uniform field rate.

The store controller 40 relies on an indication of a transition between consecutively replayed video fields in order to select the correct stores for writing and reading the replayed video data. In a DVTR in which each video field is recorded as a plurality of blocks of video data, a field identifier can be included in each data block so that field transitions can be detected by checking for a change in the field identifiers of consecutively replayed data blocks.

It is known to provide DVTRs with multiple recording and replay heads. The provision of such multiple heads allows an increase in the overall data rate at which data can be written to or read from the storage medium.

SUMMARY OF THE INVENTION

It is an object of this invention to provide an improved video replay store controller and control method.

This invention provides a video replay store controller comprising: means for receiving video data replayed from a storage medium by a plurality of separate video replay heads, said video data comprising successive data blocks, each said block including a field identifier; transition detecting means associated with each said video replay head for detecting changes in said field identifiers associated with consecutively replayed data blocks received from said video replay head, thereby detecting a field transition in said video data replayed by said video replay head; and selecting means responsive to detected field transitions in said replayed video data, for selecting one or more of a plurality of field stores for storing said replayed video data.

The invention both recognises anti solves the problem that if the video data are multiplexed between a number of magnetic read/write heads (which may be, for example, spaced apart on a rotary head drum in a helical scanning DVTR), an examination of the field identifiers in the replayed data blocks to detect field transitions can lead to the apparent detection of spurious field transitions. This can occur because the head spacing causes the heads to start and finish reading the helical tracks on the tape at different times, and so one head may still be reading data blocks from a previous video field even though another head has started reading a new video field.

By detecting field transitions individually for each head, spurious detections caused (for example) by timing differences between the reading of data tracks on the storage medium by the different heads are avoided.

As a further measure to prevent spurious, multiple detections of the same field transition, it is preferred that the transition detecting means comprises: means for detecting the field polarity of a detected field transition; and means for preventing the consecutive detection of two field transitions of the same field polarity. By insisting that consecutively detected transitions have opposite field polarities, multiple detection of a single field transition is prevented.

Although the temporal order of the video fields represented by the replayed data could be determined in, for example, a DVTR by a control signal from the tape transport indicating the direction of tape travel, it is more convenient to detect the temporal order from the replayed data themselves. To this end, it is preferred that the controller comprises means for detecting whether each detected transition is a field increment or a field decrement, thereby detecting the temporal order of the video fields represented by the replayed data.

Preferably the selecting means comprises: write store selecting means for selecting, according to a cyclic access sequence, respective ones of the plurality of field stores for storing data representing successive video fields replayed from the storage medium; and read store selecting means for selecting, according to the cyclic access sequence, respective ones of the plurality of field stores for reading data representing successive stored video fields for output.

In a preferred embodiment the write store selecting means and the read store selecting means cycle through the cyclic access sequence in response to field transitions in the replayed data.

Preferably the controller comprises means for receiving an output clocking signal comprising successive clocking pulses, each clocking pulse being associated with the reading of data representing a video field from a field store selected by the read store selecting means. The output clocking signal indicates the field period of fields for output from the field stores.

Again, although shuttle mode (in which video fields are replayed from the storage medium at a rate which is greater than the field rate of the video fields output from the field stores) could be detected by an electromechanical speed sensor associated with the storage medium, it is more convenient that the controller comprises shuttle detecting means for detecting whether more than one field transition is detected in the replayed data between consecutive clocking pulses of the output clocking signal, thereby detecting shuttle replay of the replayed data.

Because the replay of data from the storage medium and the detection of field transitions in the replayed data can be intermittent during shuttle operation, it is preferred that the shuttle detecting means comprises means for supplying art output signal indicating that shuttle replay has been detected, and an output latch for latching the output signal for a predetermined period after shuttle replay has ceased to be detected.

Preferably the controller comprises slow-motion detecting means for detecting whether field transitions in the data replayed from the storage medium are detected less frequently than clocking pulses of the output clocking signal, thereby detecting slow-motion replay of the replayed data. Once again, this allows slow-motion replay to be detected from the replayed data themselves, rather than from an electro-mechanical sensor associated with the storage medium. A signal indicating slow-motion operation may be required by subsequent error correction apparatus.

In order that odd and even field polarity replayed data are not mixed, it is preferred that the controller comprises means for controlling writing of replayed data blocks, of the same field polarity as the current video field for output, to the field store selected by the write store selecting means, and for controlling writing of replayed data blocks of the opposite field polarity to that of the current video field for output to the field store following, in the cyclic access sequence, the field store selected by the write store selecting means. However, during shuttle replay the requirement of not mixing odd and even replayed data can be relaxed, to give the benefit of doubling the amount of useable replayed data. To achieve this it is preferable that the controller comprises means for controlling writing of replayed data blocks, of either field polarity, to the field store selected by the write store selecting means and to the field store following, in the cyclic access sequence, the field store selected by the write store selecting means, during shuttle replay.

In a preferred embodiment the controller comprises: means for receiving replayed data from a plurality of replay channels, each replay channel comprising a time-multiplexed combination of data replayed from a plurality of replay heads; and the write store selecting means comprises write store requesting means for selecting a field store according to the cyclic access sequence, and a plurality of write store enabling means associated with the plurality of replay channels and each responsive to the field store selected by the write store requesting means for controlling writing of replayed data from a respective channel to one of the field stores. In this case, to avoid the write store enabling means getting out of step with one another it is preferred to employ means for latching the field store selection made by the write store requesting means between successive detected field transitions.

In advantageously simple and convenient embodiments the controller comprises a programmable read only memory (PROM), the PROM receiving as address input signals:
(i) a signal indicative of shuttle replay;
(ii) signals indicative of field increments and field decrements in the replayed data;
(iii) a feedback signal indicative of forward or reverse temporal order of the replayed video fields;
(iv) a feedback signal indicative of slow-motion replay;
(v) a signal indicative of the field polarity of the current video field for output; and
(vi) feedback signals indicative of the field store currently selected for storing replayed data;
and the PROM generating as data output signals:
(i) the feedback signal indicative of forward or reverse temporal order of the replayed video fields;
(ii) a signal indicative of the field store currently selected for reading video fields for output;
(iii) a signal indicative of the field store currently selected for storing replayed data;
(iv) a signal for preventing storing of replayed data in the field store currently selected for storing replayed data, in the case that the same field store is selected for storing replayed data and for reading data for output;
(v) the feedback signal indicative of slow-motion replay; and
(vi) a signal for marking as erroneous the video data read from a field store selected by the read store selecting means immediately after a change in the temporal order of video fields represented by the replayed data.

Viewed from a second aspect this invention provides a video replay store comprising: a plurality of field stores; and a video replay store controller as hereinbefore defined.

Preferably the video replay store comprises four field stores.

Viewed from a third aspect this invention provides a video replay apparatus comprising: means for replaying data representing successive video fields from a storage medium; and a video replay store controller as hereinbefore defined.

A fourth aspect of this invention provides a method of controlling a video replay store, said method comprising the steps of: receiving video data replayed from a storage medium by a plurality of separate video replay heads, said video data comprising successive data blocks, each block including a field identifier; for each video replay head, detecting changes in said field identifiers associated with consecutively replayed data blocks received from that video replay head, thereby detecting a field transition in data replayed by that video replay head; and selecting, in response to detected field transitions in said replayed video data, one or more of a plurality of field stores for storing said replayed video data.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 8 is a timing diagram illustrating slow-motion operation of the store controller of FIG. 3;

FIG. 9 is a timing diagram illustrating slow-motion operation of the store controller of FIG. 3 during a transition from forward to reverse replay;

DESCRIPTION OF THE PREFERRED EMBODIMENTS

Before an embodiment of a store controller is described below, the format and nature of replayed video data received by the store controller will first be described with reference to FIG. 2.

Figure 1:
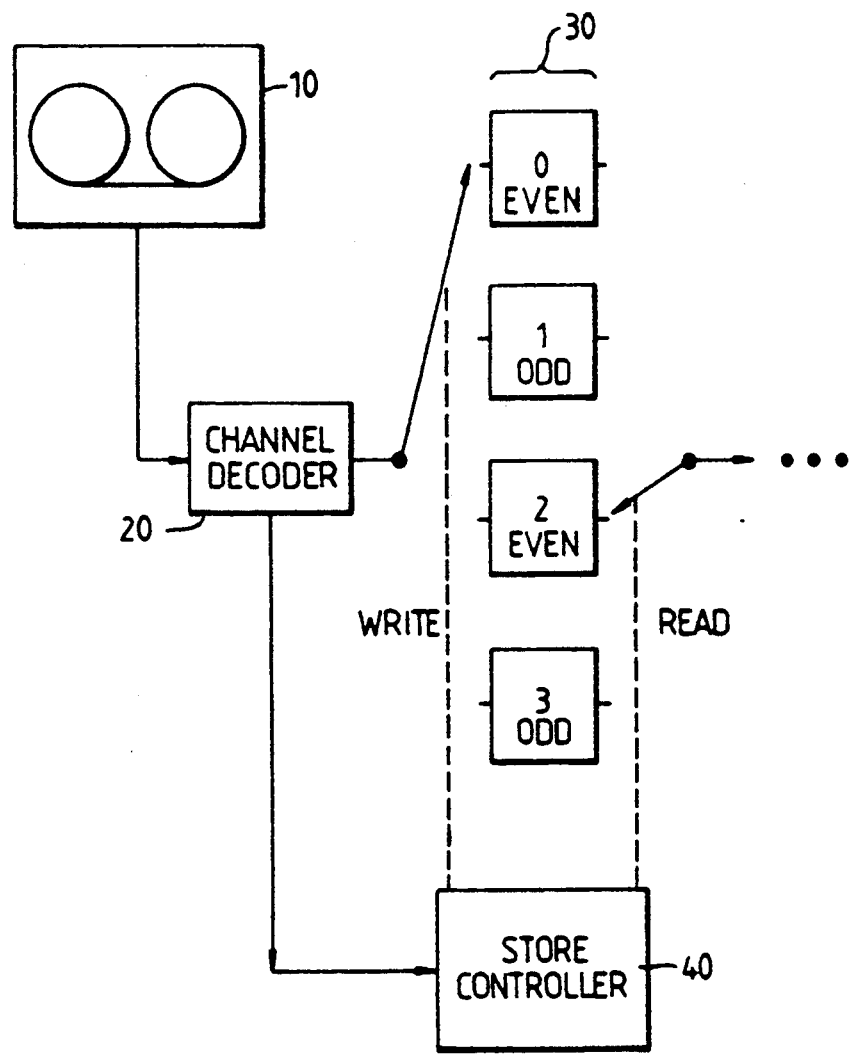
FIG. 1 is a schematic diagram of a previously proposed digital video tape recorder.
Figure 2:
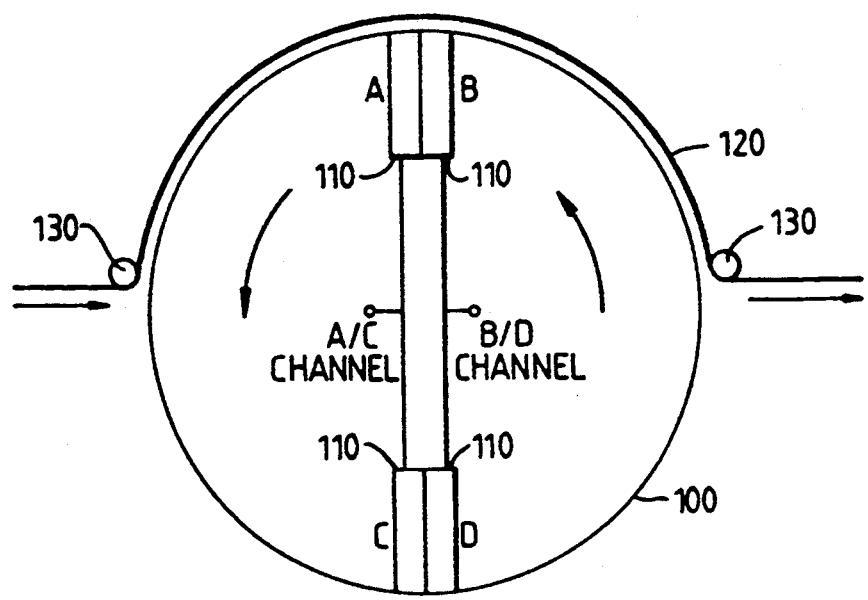
FIG. 2 illustrates a rotary head drum having four magnetic replay heads multiplexed onto two data channels.

FIG. 2 is a schematic illustration of a rotary head drum 100 for use in a digital video tape recorder (DVTR) transport. The rotary head drum 100 carries four magnetic record/replay heads 110, referred to as heads A, B, C and D. A magnetic tape 120 is guided by two rollers 130 to give a 180° wrap around the rotary head drum 100. In use, the rotary head drum rotates at 50 revolutions per second, so that helical scanning is performed and the magnetic heads 110 trace out oblique record/replay tracks on the magnetic tape 120.

The magnetic heads 110 are arranged in 2 groups; in this arrangement, the magnetic heads A and B are closely spaced to form one group of magnetic heads, and the magnetic heads C and D are closely spaced to form another group. The two groups of magnetic heads are situated at opposite sides of the rotary head drum 100. Because a 180° wrap angle is used for the magnetic tape 120, the magnetic heads from only one of the two groups will cross the tape at any one time. This enables signals replayed from the magnetic heads A and C to be time-multiplexed onto a single line or channel, the A/C channel, and those from the magnetic heads B and D to be multiplexed onto a single B/D channel.

In the direction of rotation of the rotary head drum 100, the magnetic head A is offset slightly ahead of the magnetic head B. This has two effects: one is that the two magnetic heads A and B will trace out spaced parallel oblique tracks on the magnetic tape 120, and the other is that, for a particular half-rotation of the rotary head drum 100, the replayed signals from the magnetic head A will start and finish slightly earlier in time than those from the magnetic head B. Similarly, the replayed signals from the magnetic head D will start and finish slightly earlier in time than those from the magnetic head C.

Figure 3A:
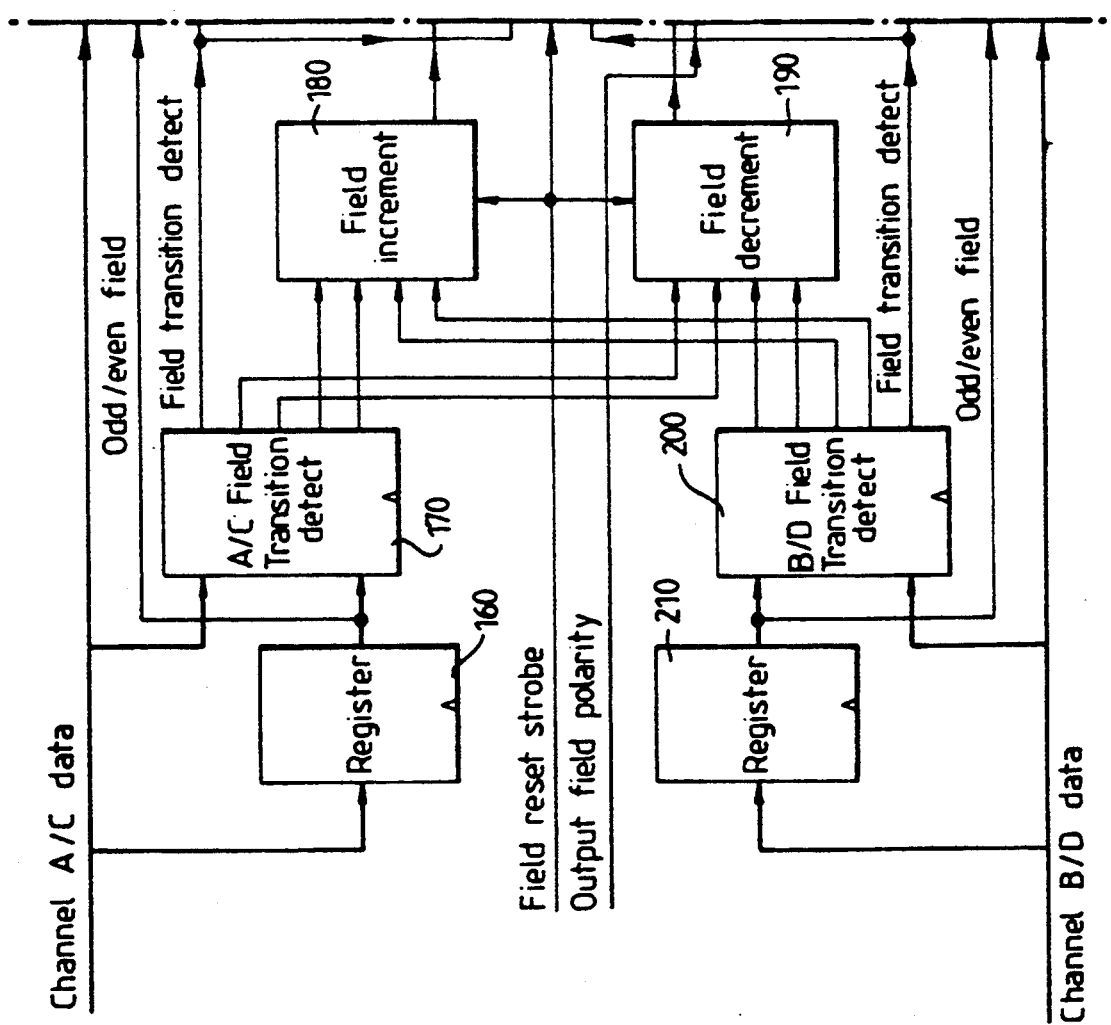
FIG. 3 is a schematic diagram of a store controller.
Figure 3B:
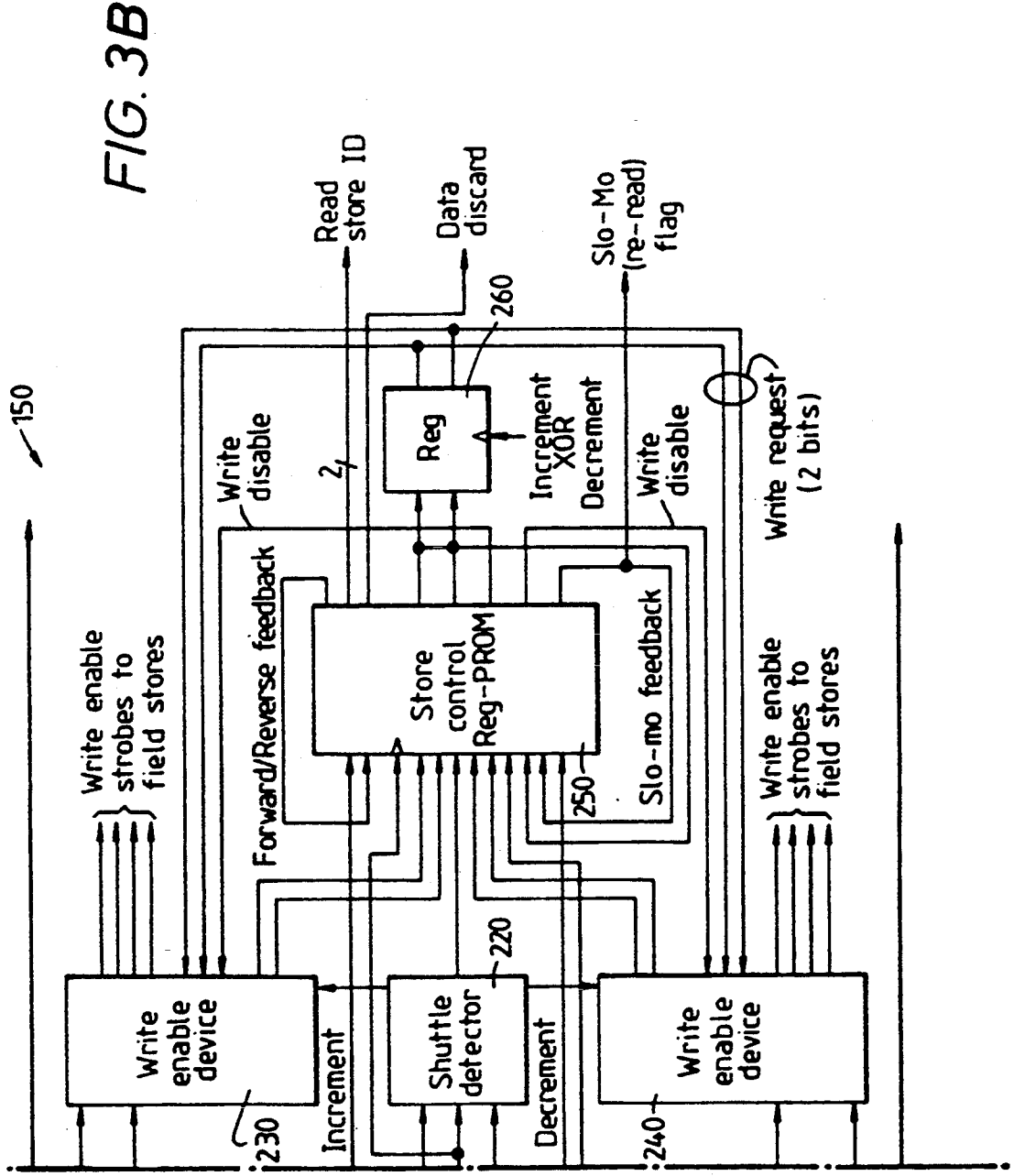

FIG. 3 is a schematic diagram of a store controller 150. The store controller receives replayed time-multiplexed video data from the A/C channel and the B/D channel, via respective channel decoders 20. The store controller also receives two signals relating to the timing of the video fields output by the DVTR, namely a field reset strobe signal which provides clocking pulses to mark the boundary between adjacent fields output by the DVTR, and an output field polarity signal which, at any time, indicates whether the current field being output by the DVTR is an odd or an even video field.

Several output signals are generated by the store controller 150. These comprise a 2-bit read store identification (ID) signal, which identifies the field store from which the current field for output by the DVTR should be read; a slo-mo (re-read) flag which indicates that slow motion replay is being carried out and that a single field store will therefore be read for two or more consecutive output fields (this signal is needed by error processing apparatus downstream of the store controller); two sets of write enable (WE) strobe signals appropriate to the channel A/C data and the channel B/D data respectively, to control which of the 4 field stores is used to store data from that channel; and a data discard flag (to be described below).

The replayed video data from each of the channels (A/C or B/D) comprise a succession of blocks of data. A large number (typically several hundred) of these blocks of data is written onto each oblique track on the magnetic tape 120 during a single sweep of one of the magnetic heads 110. Each block includes a field identifier, generated at the time of recording, indicative of the position of the field to which that block corresponds in a four-field repetitive sequence. For example, data blocks from one video field may be written with an identification code of zero, those from the next video field with an identification code of 1, those from the next field with an identification code of 2, those from the next field with a code of 3, those from the next with a code of zero and so on. These field identification codes contained in the data blocks are used, as described below, to detect field transitions in the replayed data (by detecting a change in the field identification code associated with successive blocks) and to detect the field polarity (odd or even) of each replayed data block.

The processing performed by the channel decoders 20 ensures that blocks of data received by the store controller have reliable identification codes. Also, the error detection and correction processing performed by the channel decoders generates error flags associated with the data blocks, which indicate whether or not the data blocks are error free.

Referring again to FIG. 3, an A/C field transition detector 170 receives replayed identification codes from the A/C channel, from both the current block and also the previous block (via a delay or register 160, which is clocked at the block rate). The A/C field transition detector 170 compares the field IDs in successive data blocks replayed by each individual replay head to generate the following 5 output signals from the A/C channel data:

a general field transition flag to indicate that a transition has been detected;

an odd to even (positive field polarity) field increment signal;

an even to odd (negative field polarity) field increment signal;

an odd to even (positive field polarity) field decrement signal; and an even to odd (negative field polarity) field decrement signal.

The operation of the A/C field transition detector 170 will be described further with reference to FIG. 4 below.

The two (positive and negative field polarity) field increment signals generated by the A/C field transition detector 170 are passed to a field increment processor 180, and the two field decrement signals generated by the A/C field transition detector 170 are passed to a field decrement processor 190.

The initial processing applied to replayed data from the B/D channel mirrors that applied to the channel A/C data, in that a B/D field transition detector 200 receives the channel B/D data directly and also via a register 210. The B/D field transition detector 200 generates five output signals corresponding to those listed above for the A/C field transition detector 170. Of these output signals, the B/D field transition detector 200 supplies the two field increment signals to the field increment processor 180, and the two field decrement signals to the field decrement processor 190.

The field increment processor 180 and the field decrement processor 190 ape used to eliminate spurious multiple field transitions in the replayed data. These multiple transitions can occur during slow motion replay, in which the magnetic tape 120 is advanced slowly past the rotary head drum 100 so that a single field transition on the tape may be read by the magnetic heads several times. If it was assumed that a genuine field transition had taken place on each of the multiple readings of this single field transition, this could lead to spurious operation of the store controller 150. The solution to this problem used in the field increment processor 180 and the field decrement processor 190 is to employ a register which records whether a detected transition was of positive field polarity or negative field polarity. Once a transition of one field polarity had been recorded, others of the same field polarity are discarded; the next successful transition has to be of the opposite field polarity. The operation of the field increment processor 180 and the field decrement processor 190 will be described further below with reference to FIG. 5.

The general field transition signals from the field transition detectors 170 and 200 are passed, along with the field reset strobe signal, to a shuttle detector 220. The shuttle detector 220 operates to detect shuttle (high speed) operation of the tape transport of the DVTR directly from the replayed data (that is, without requiring a separate control signal supplied from the tape transport). In operation, incoming field transition signals from the A/C field transition detector 170 shift binary ones into a resettable shift register. The resettable shift register is reset by the field reset strobe signal, and a signal indicative of shuttle mode operation is derived from the second element in the resettable shift register. Likewise, a similar shift register arrangement is provided for data from the B/D channel, and the separate A/C and B/D shuttle detections are combined into a single signal. In this way, the shuttle detector operates to detect the fact that two field transitions have been detected in the replayed data (from either channel) between two successive (output) field reset strobes.

When the DVTR is in shuttle mode only some of the data blocks on the tape are successfully replayed, so the detection of field transitions between successive replayed data blocks may be unreliable. For this reason, the respective outputs from the A/C and B/D sections of the shuttle detector 220 are registered immediately after the shuttle mode is detected and are held for 16 or so output field intervals after the last field in which shuttle mode was detected, in order to prevent spurious and frequent transitions to and from shuttle mode by the shuttle detector.

For each of the data channels (A/C and B/D) a respective write enable device 230, 240 generates write enable (WE) strobe signals to control writing of that channel's data into the selected field store. For the A/C channel the write enable device 230 receives the following inputs:

the general field transition signal from the A/C field transition detector 170;
 a signal indicative of the field polarity of the current replayed data block (supplied from the output of the register 160);
 a signal indicative of whether shuttle operation is being performed (from the shuttle detector 220);
 a write request signal from a store control programmable read only memory (PROM) 250 (to be described below); and
 a write disable signal from the store control PROM 250.

Again, the configuration for the B/D channel mirrors that of the A/C channel in that the WE device 240 receives corresponding inputs from the B/D channel B/D field transition detector 200 and the register 210.

As described above, the write enable device 230 (or 240) supplies WE strobe signals to the 4 field stores to control where replayed data from that channel are written. Each time the write enable device is clocked by the general field transition signal from the field transition detector, it supplies a WE strobe signal to either an even field store or an odd field store depending on the field polarity of the replayed data block currently being received.

The store control PROM 250 is a registered read only memory which is clocked by the field reset strobe signal (that is, the signal related to the timing of the video fields output by the DVTR). In its operation as a PROM, it receives a number of input signals which are combined to form an address signal, and it generates output signals corresponding to that combination of input signals by reading a stored data word at that address within the store control PROM. The store control PROM has the following inputs:

a shuttle flag from the shuttle detector 220;
 field increment and decrement flags from the field increment processor 180 and the field decrement processor 190;
 a forward/reverse operation feedback signal from the output of the store control PROM 250;
 a slow-motion feedback signal from the output of the store control PROM 250;
 the output field polarity signal;
 a write request feedback signal from the output of the store control PROM 250; and
 write store status signals from the write enable devices 230, 240, each signal indicating the field store currently selected by a respective write enable device.

Based on various combinations of these input signals, to be discussed below, the store control PROM 250 generates outputs as follows:

(i) A forward/reverse feedback signal. This is derived from the increment and decrement signals from the field increment processor 180 and the field decrement processor 190 respectively, and indicates whether successive fields are being replayed in a forward or reverse temporal order. If the field identification codes of the replayed fields are increasing (indicated by an increment signal from the field increment processor 180) then the forward/reverse feedback signal is set to indicate forward operation. Likewise a signal from the field decrement processor 190 indicating that the field identification code of successive replayed fields is decreasing results in the forward/reverse feedback signal being set to indicate reverse operation. In this way the store controller can detect whether the magnetic tape 120 is moving in a forward or reverse direction from the replayed data alone (that is, without requiring a control signal from the tape transport).

The forward/reverse feedback signal is supplied as a feedback input to the store control PROM 250. It is used by the store control PROM 250 when the shuttle flag from the shuttle detector indicates that shuttle operation is being performed. When shuttle operation is indicated the forward/reverse feedback signal takes precedence over the direction of tape motion indicated by the increment and decrement signals. This is done for two reasons: firstly, because the detection of increments and decrements in the replayed field transitions can be ambiguous during shuttle operation, and, secondly, because once shuttle operation has been initiated it can safely be assumed that the direction of operation of the tape transport will not change until shuttle operation ceases.

The forward/reverse flag is also used when the shuttle flag is not active, but when there is a conflict between the increment and decrement signals (i.e. neither or both are true/false). In such a condition the forward/reverse feedback signal is used to recirculate (or hold) the current replay direction. A further use of the forward/reverse flag occurs during a change in the replay direction. During the actual change in direction (which is detected by there being a transition in the forward/reverse flag) the store controller operates according to a transitional mode of operation (to be described below).

(ii) A read store identification word. This determines the store which is to be used to read the current field for output by the DVTR. One store of the four is always used to read data for output. The read store identification follows the cyclic access sequence 0, 1, 2, 3, 0, 1 . . . , changing each time a field reset strobe is received. During slow motion operation the read store number will be held for more than one output field period.

(iii) A write request (WR) signal. The WR signal indicates the field store which should be selected next by the write enable devices 230 and 240. (The WR signal is in fact supplied to the write enable devices from the store control PROM 250 via a further register 260. The need for and the operation of the register 260 will be discussed below with reference to FIGS. 10 and 11.)

(iv) A write disable signal. The write disable signal is derived by a logical combination of the read store identification word generated by the store control PROM 250 and the write store status signals supplied by each of the write enable devices 230, 240 to the store control PROM 250. The write disable signal is used to prevent any writing to the field stores being made in the (rare) event of a conflict between reading from and writing to the same store. This arrangement is used so that reading from the stores, in the event of a conflict, always take precedence over writing to the stores.

(v) A slo-mo (re-read) flag. This signal is used to indicate that neither a field increment nor a field decrement signal has been received between successive field reset strobes (that is, between successive fields output by the DVTR). This indicates that the DVTR is in slow motion operation and that the field data in the current field store will have to be re-used or re-read. The slo-mo (re-read) flag is required by error processing apparatus downstream of the store controller 150 in which data from a field store which have been read once are treated as being in error on subsequent read operations unless the slo-mo flag is set.

(vi) A data discard flag. When a change in the replay direction is detected (by comparing the forward/reverse feedback signal with the current status of the increment and decrement signals supplied by the field increment processor 180 and the field decrement processor 190 respectively), the data discard flag is used to cause error concealment apparatus downstream of the field stores to discard the data read from the field stores immediately after the change in replay direction. This is performed because the field stored in the store selected after the change in direction would represent continued motion in the replay direction which applied before the change. It is subjectively less disturbing to repeat the field which was output from the field stores immediately before the change in direction.

The store control PROM 250 is clocked by the field reset strobe signal so that a new set of outputs may be generated once for every field output by the DVTR. The store control PROM 250 is arranged to maintain a difference of 2 between the read store selected by the read store identification word and the write store selected on the write request lines. This means that during forward operation the field stores indicated on the read store ID and write request outputs of the store control PROM progress as follows:

| WRITE REQUEST | 0 | 1 | 2 | 3 | 0 | ... |
|---|---|---|---|---|---|---|
| READ STORE | 2 | 3 | 0 | 1 | 2 | ... |
| OUTPUT FIELD | Even | Odd | Even | Odd | Even | ... |
| (WRITE ACTIVE) | 3 | 0 | 1 | 2 | 3 | ... |

With the exception of shuttle operation of the DVTR (described below), the write enable devices 230, 240 control the writing of even field data blocks to the even field stores 0 and 2 and odd field data blocks to the odd field stores 1 and 3. The WR signal generated by the store control PROM 250 indicates a single field store during each output field period, which is either odd or even depending on the field polarity of the current output field. However, the transition between data blocks from odd fields and data blocks from even fields may occur at any time during a single output field period and is indicated to the write enable devices 230, 240 by the general field transition signal. The field polarity of the received data blocks is indicated by the odd/even field polarity signal from the output of the register 160. The write enable devices select a field store for storing each replayed data block in response to the polarity of that data block and the field store indicated by the WR signal.

The basic rule followed is that a replayed data block of the same field polarity as that of the current output field will be written to the field store indicated by the WR signal, and a replayed data block of the opposite field polarity to the current output field will be written to a field store numerically adjacent to the one indicated by the WR signal. Whenever the write enable device 230 is clocked by a general field transition signal from the A/C field transition detector 170 (indicating a change in field polarity of the replayed data blocks), it therefore selects on the write enable strobes either the field store indicated by the WR signal from the store control PROM 250 or an adjacent field store of the opposite field polarity to that indicated by the WR signal. The selection of field stores by the write enable devices is illustrated in the following table:

| WR signal | Even Field Data | Odd Field Data |
|---|---|---|
| 0 | 0 | 1 |
| 1 | 2 | 1 |
| 2 | 2 | 3 |
| 3 | 0 | 3 |

An exception to the above protocol is used when the shuttle detector 220 detects that shuttle operation is being performed. During shuttle operation the write enable device 230 selects, on reception of a general field transition signal, both stores indicated in the above table from the WR signal. This is done to improve the quality of the pictures replayed during shuttle operation; the reduction in quality due to mixing data from the odd and even fields is far less significant than the improvement obtained by doubling the amount of data written to each field during shuttle operation.

The store access sequence for writing to and reading from the field stores will be demonstrated with reference to the table below. This table represents a situation in which a number of video fields, F1 to F8, are replayed by the DVTR. When the video field F8 is replayed the tape direction is reversed so that the fields F7 to F1 are read again, but in reverse temporal order. In other words, the following video field sequence is replayed from the tape:

| F1, F2, F3, F4, F5, F6, F7, F8, F7, F6, F5, F4, F3, F2, F1 | | | | |
|---|---|---|---|---|
| Write Store | Read Store | Write Field | Read Field | |
| 3 | 2 | F1 | — | Forward |
| 0 | 3 | F2 | F1 | Replay |
| 1 | 0 | F3 | F2 | |
| 2 | 1 | F4 | F3 | |
| 3 | 2 | F5 | F4 | |
| 0 | 3 | F6 | F5 | |
| 1 | 0 | F7 | F6 | |
| 2 | 1 | F8 | F7 | |
| 3 | 2 | F7 | (F8) F7 | Reverse |
| 0 | 3 | F6 | F7 | Replay |
| 1 | 0 | F5 | F6 | |
| 2 | 1 | F4 | F5 | |
| 3 | 2 | F3 | F4 | |
| 0 | 3 | F2 | F3 | |
| 1 | 0 | F1 | F2 | |

The above table demonstrates that there is a one-field delay between the time of the tape direction reversing and the reversal of the temporal order of the video fields read from the field stores. In other words, the temporal order of the video fields read from the stores does not reverse until the second video field after the change in tape direction. In the table above, the read field store selected immediately after the change in replay direction is store 2, which nominally contains the field F8. Replay of the field F8 would represent continued forward motion after the direction of tape motion has been reversed, which would be subjectively disturbing during very slow jog operation of the DVTR.

Therefore, in order to avoid this problem, the store controller generates the data discard signal which artificially flags as erroneous the data read from the read store selected immediately after a change in replay direction. Subsequent error concealment processing then operates to substitute the previous field (i.e. the field F7) for the field F8. In this way the field F7 is output by the DVTR as three consecutive output fields.

Figure 4:
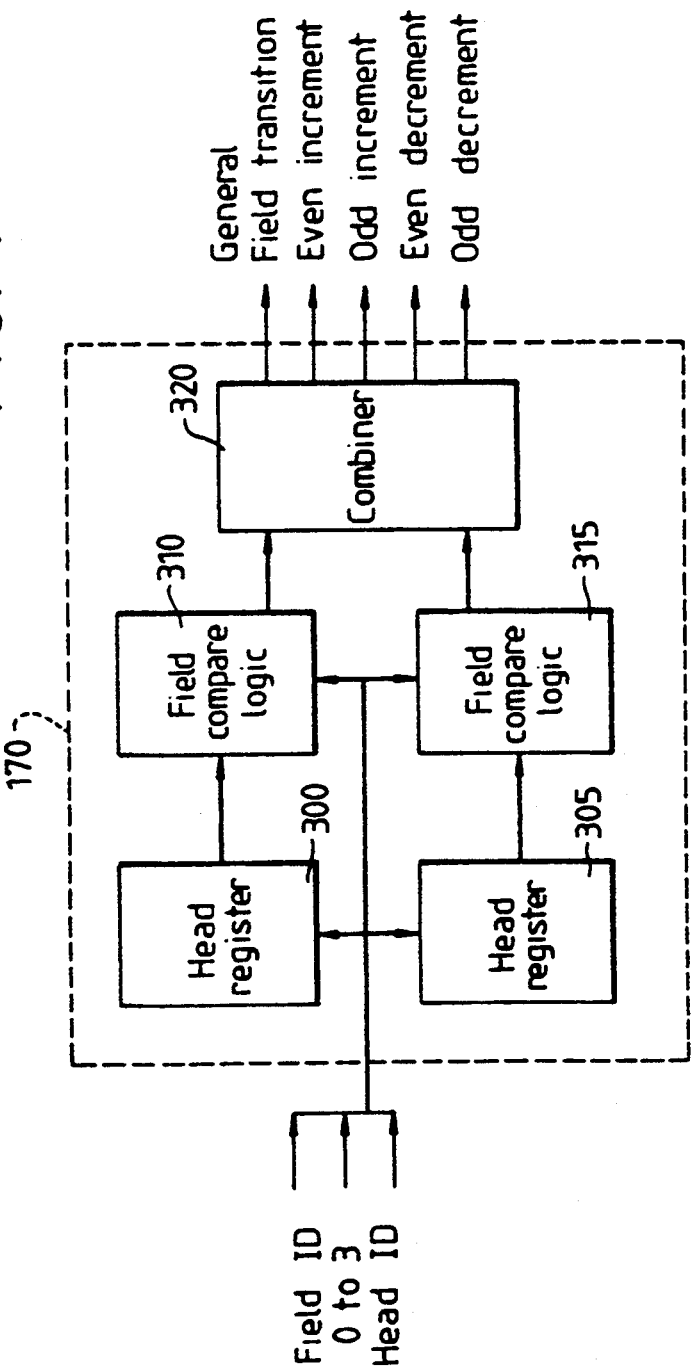
FIG. 4 is a schematic diagram of a field transition detector.

FIG. 4 is a schematic diagram of the A/C field transition detector 170 (the B/D field transition detector 200 having a similar structure). The A/C field transition detector 170 is responsive to the field identifier included in each data block and to a signal identifying the magnetic head from which the current data block is being read. The field identifiers are stored in head registers 300 and 305 appropriate to each head. In other words, the field identifiers derived from data blocks read by the magnetic head A are stored in the head register 300 dedicated to the magnetic head A, and those from the magnetic head C are stored in the register 305 dedicated to the magnetic head C.

Each of the magnetic heads A and C also has a dedicated field compare logic unit 310, 315 in which the field identifier from the current data block read from that magnetic head is compared with the field identifier of the previous data block read by that magnetic head (which is stored in the head register 300, 305 for that magnetic head). If the field compare logic unit 310, 315 detects a difference between the current and previous field identifiers, it supplies a signal to a combiner 320. The signals supplied by the field compare logic units indicate whether the current data block is from a field temporally before or after that of the previous data block (i.e. whether the transition is a field increment or a field decrement) and also the field polarity of the transition (odd or even).

The combiner 320 receives even and odd field increment and even and odd field decrement signals from each of the field compare logic units 310, 315. It applies a logical OR operation to all of the signals it receives to generate a general field transition signal. In other words, a general field transition signal is generated if an even or an odd increment or decrement has been detected by either of the field compare logic units 310, 315. The combiner 320 also applies individual logical OR operations to each of the increment and decrement signals from the field compare logic units 310, 315. This means that, for example, if an even increment signal is received from either of the field compare logic units 310, 315 then a single even increment signal will be output by the A/C field transition detector.

A significant feature of the A/C field transition detector of FIG. 4 is that the field identifiers from data blocks read by the individual magnetic heads are stored separately. If this were not the case, then the comparison, for example, of a field identifier read by magnetic head A with one read by magnetic head C could lead to errors during slow-motion replay where one of the magnetic heads crosses a track from one field while the other magnetic head crosses a track of an adjacent field.

Figure 5:
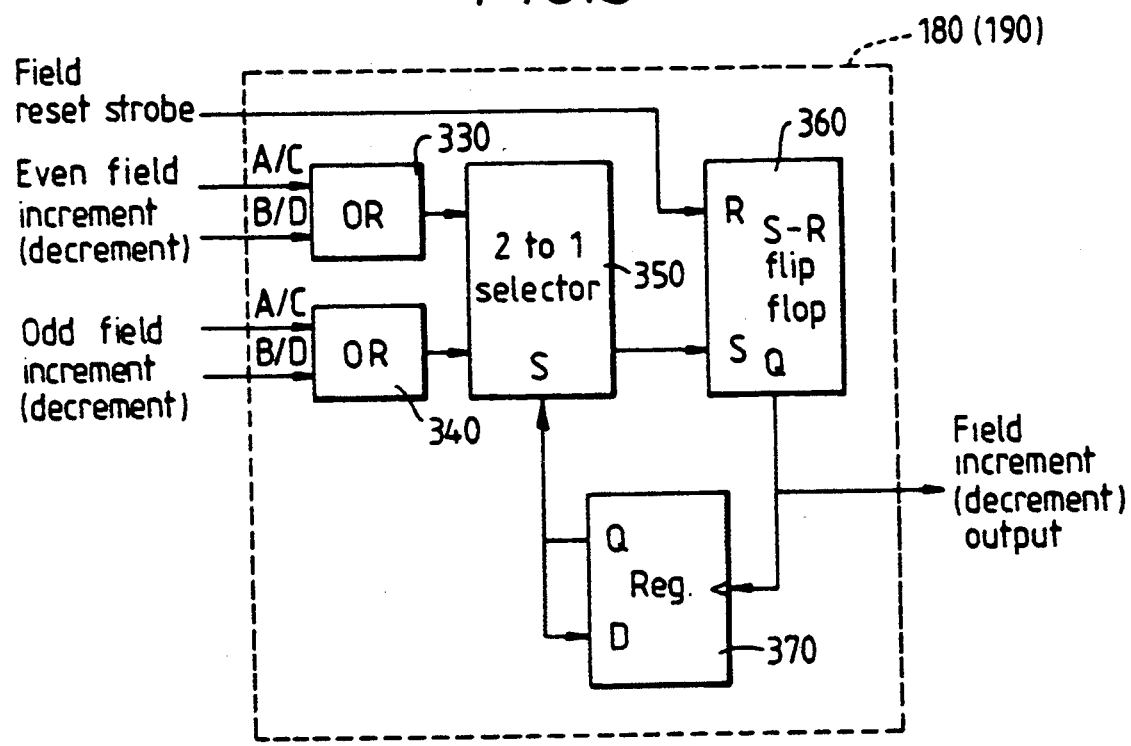
FIG. 5 is a schematic diagram of a field transition processor.

FIG. 5 is a schematic diagram of a field transition processor such as the field increment processor 180 or the field decrement processor 190. The field transition processor of FIG. 5 receives the field reset strobe signal (which provides clocking pulses to mark the boundary between adjacent fields output by the DVTR) along with even and odd transition signals from the A/C and B/D field transition detectors 170, 200. In the case of the field increment processor 180, the signals received from the two field transition detectors 170, 200 are even and odd field increment signals, and in the case of the field decrement processor 190, the signals received from the two field transition detectors 170, 200 are even and odd field decrement signals.

The even field transition signals from the two channels (A/C and B/D) are supplied to a logical OR gate 330. Similarly, the odd field transition signals from the two channels are supplied to a logical OR gate 340. The logical OR gates 330, 340 generate an output if either of their two inputs is set. The output of one of the logical-OR gates 330, 340 is selected by a 2 to 1 selector 350 and is supplied as a set (S) input to an S-R flip flop 360. The S-R flip flop 360 also receives the field reset strobe signal as a reset (R) signal, and supplies a data (Q) output as a transition output (increment or decrement) and to a flip flop 370. The flip flop 370 employs the data output from the S-R flip flop 360 as a clocking signal, and supplies its data output (Q) to be used as a selection signal (S) to control the 2 to 1 selector 350 and as a fed-back data input (D) for the flip flop 370.

The operation of the circuit shown in FIG. 5 will now be described, assuming that the last field transition to be detected was an odd polarity field transition, and that the S-R flip-flop has since been reset by the field reset strobe signal. In these circumstances, the one of the logical OR gates selected by the 2 to 1 selector 350 is the logical OR gate 330 which receives even field transition signals. This means that any odd field transitions detected at this stage are ignored by the field transition processor, since the output of the logical OR gate 340 (which receives odd polarity transition signals) is not selected by the 2 to 1 selector 350.

When an even polarity field transition signal is received by the logical OR gate 330 it causes the output of that gate to be set. This output is transferred, via the 2 to 1 selector 350, to the S-R flip flop 360. The output Q of the S-R flip flop 360 is set, which means that a transition is indicated on the output of the field transition processor and that the flip flop 370 is clocked. Clocking the flip flop 370 changes the state of its output, which in turn changes the selection made by the 2 to 1 selector 350. The logical OR gate 330 is now deselected, so that further even polarity field transitions will not cause a transition output from the field transition processor, and the logical OR gate 340 is now selected.

The S-R flip flop remains set until it is reset by a clocking pulse of the field reset strobe signal. The circuit is then available to be triggered by an odd polarity transition signal received by the logical OR gate 340.

Figure 6:
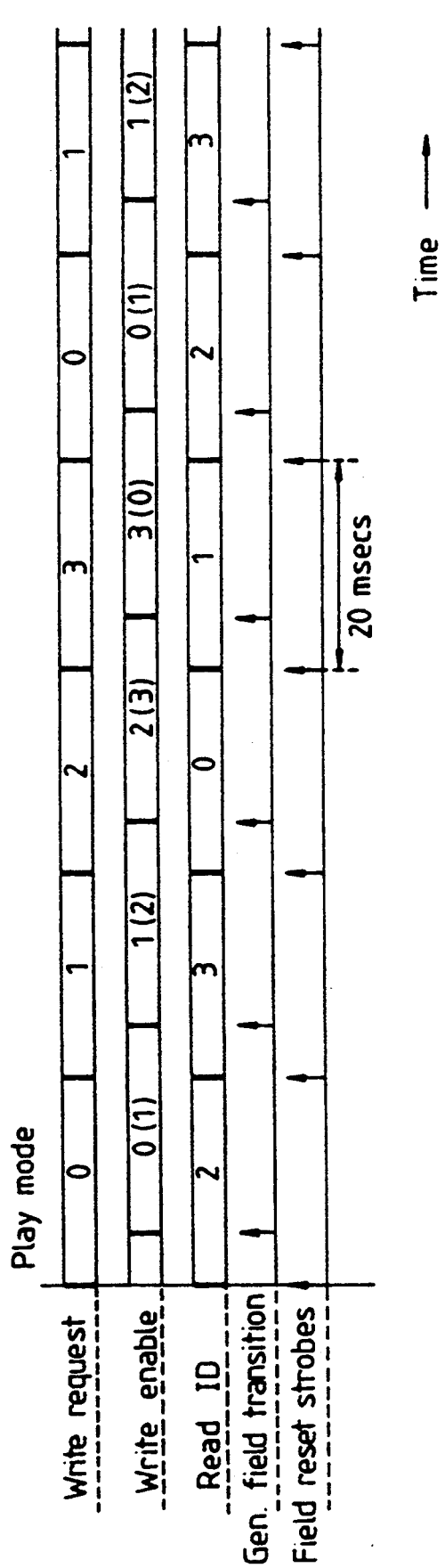
FIG. 6 is a timing diagram illustrating standard speed play mode operation of the store controller of FIG. 3.

FIG. 6 is a timing diagram illustrating standard speed play mode operation of the store controller 150. The operation is shown in relation to the timing of two sets of clocking pulses, the general field transition signal and the field reset strobe signal. These two sets of clocking pulses are illustrated as vertical pointers on a horizontal time axis. The period between successive field reset strobe clocking pulses is 20 milliseconds (msecs), which is equal to the period of one 50 Hz video field output by the DVTR.

Two sets of signals output by the store control PROM 250 are illustrated: these are the write request signal and the read ID word. Since the store control PROM 250 is clocked by the field reset strobe signal, transitions in the write request and read ID signals occur at each clocking pulse of the field reset strobe signal. The read ID word follows the sequence 2, 3, 0, 1, 2, 3 . . . and the write request signal follows the sequence 0, 1, 2, 3, 0, 1 . . . maintaining a difference of two between the field stores specified by the write request signal and the read ID word.

The write enable devices 230, 240 are clocked by the general field transition signal to generate write enable strobe signals. This is illustrated in FIG. 6 in which a transition in the write enable strobe signal occurs at each clocking pulse of the general field transition signal. As described above, when the write enable devices are clocked by the general field transition signal they select either the field store identified on the write request output of the store control PROM 250 (for data blocks of the same field polarity as the current output field) or an adjacent field store (for data blocks of the opposite field polarity to the current output field). The notation used to indicate this in FIG. 6 is that the first figure in each section of the write enable strobe signal is the number of the field store selected for data blocks of the same field polarity as the current output field, and the figure in brackets is the field store selected for data blocks of the opposite field polarity to the current output field. For example, during forward mode operation, the first general field transition clocking pulse received after the write request output of the store control PROM 250 has been set to 2 causes a write enable strobe output of 2(3).

Figure 7:
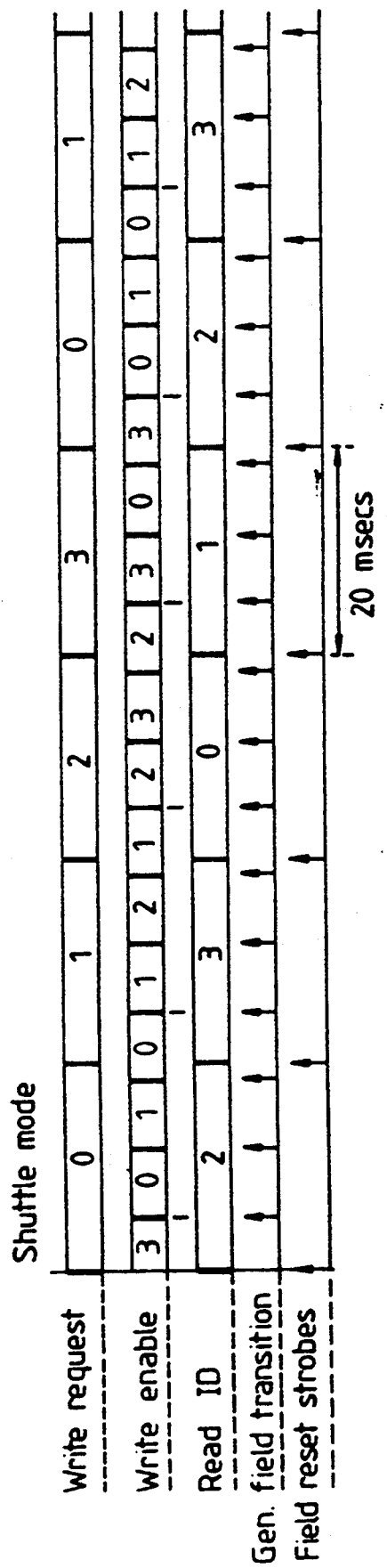
FIG. 7 is a timing diagram illustrating shuttle (high speed) mode operation of the store controller of FIG. 3.

FIG. 7 is a timing diagram illustrating shuttle (high speed) mode operation of the store controller 150. As in FIG. 6, the store controller receives clocking pulses of the field reset strobe signal at 20 millisecond intervals to mark the start of each new video field output by the DVTR. However, during shuttle mode operation, the store controller 150 receives more than one general field transition clocking pulse between successive field reset strobe clocking pulses.

In order to maximise the amount of usable video data during shuttle mode operation, the store controller 250 and the write enable devices 230, 240 control the writing of replayed data blocks of either field polarity to the currently selected field store and to the following store in the cyclic sequence. The image distortions caused by mixing odd and even field data in this way are outweighed by the subjective improvement in picture quality during shuttle replay.

FIG. 8 is a timing diagram illustrating slow-motion operation of the store controller 150. Again, FIG. 8 is similar to FIGS. 6 and 7, except that in slow-motion operation general field transition clocking pulses are received less frequently than field reset strobe clocking pulses, which is indicative of the fact that fields are replayed from the tape at a rate slower than the output field rate of the DVTR.

As before, when each clocking pulse of the general field transition signal is received by the write enable devices, a pair of output fields (0 (1), 1 (2) . . . ) are selected on the write enable strobe output. The particular field stores selected in this way depend on the state of the write request output of the store control PROM 250 at the time of the clocking pulse on the general field transition signal.

The store control PROM 250 is clocked by the field reset strobe signal, so that transitions in the write request and read ID signals occur at certain clocking pulses of the field reset strobe signal. Because the video fields recorded on the tape are being replayed at less than normal speed, the same field store is selected by the read ID word for possibly two or more consecutive output fields of the DVTR. When a new field is replayed from the tape (indicated by a clocking pulse on the general field transition signal), the field stores selected on the write request and read ID outputs of the store control PROM 250 advance by one in the store access sequence. As shown in FIG. 8, during forward slo-mo operation the read ID word follows the sequence 2, 3, 3, 0, 0, 1 . . . and the write request signal follows the sequence 0, 1, 1, 2, 2, 3 . . . maintaining, as before, a difference of two between the field stores specified by the write request signal and the read ID word.

FIG. 9 is a timing diagram illustrating slow-motion operation of the store controller 150 during a transition or change-over from forward to reverse replay.

A change in temporal order of the replayed fields (i.e. a change in the tape direction) is detected by a comparison of the outputs of the field increment processor 180 and the field decrement processor 190 with the forward/reverse feedback signal. The change is detected at the boundary between two adjacent replayed fields, which corresponds to the time of a clocking pulse in the general field transition signal. However, the write request and read ID outputs of the store control PROM 250 change only when the store control PROM is clocked by a clocking pulse of the field reset strobe signal. Thus, at the next such clocking pulse after the change in tape direction has been detected, the, field store numbers specified on the write request and read ID outputs of the store control PROM 250 are incremented, but the data from the read store are discarded.

FIG. 9 also shows the data discard flag which is set by the store control PROM during the time that store 0 is selected for reading, immediately after the change in direction. As described above, the data discard flag artificially marks as erroneous the data read immediately after the change in direction, which causes subsequent error concealment apparatus to repeat the field output immediately before the change in direction.

Figure 10:
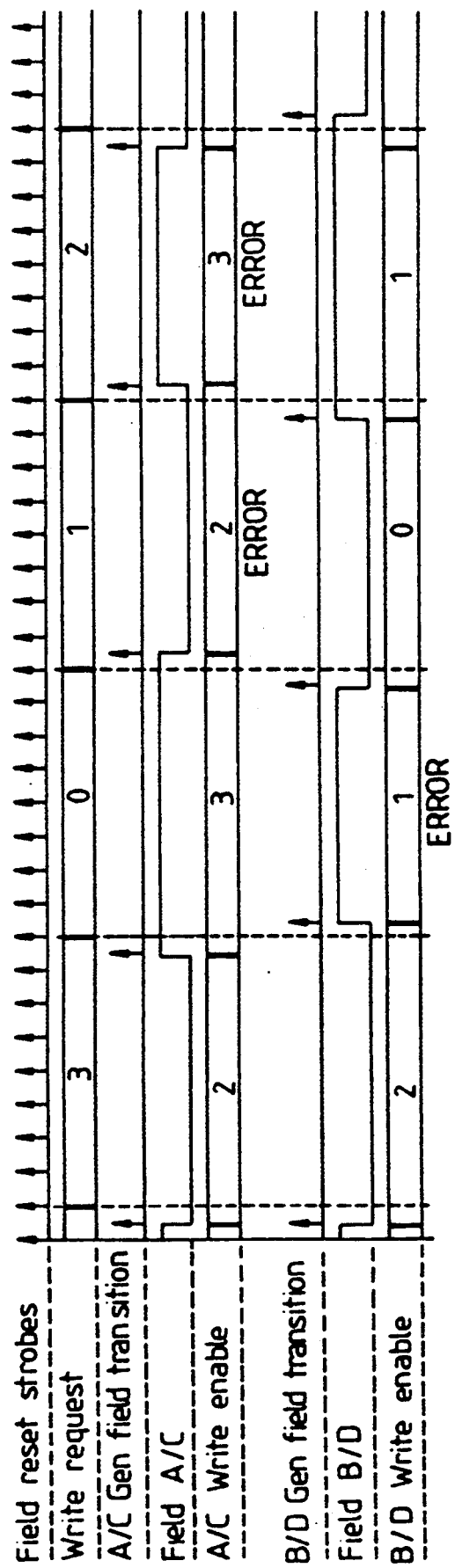
FIG. 10 is a timing diagram illustrating an error condition which could occur during slow-motion replay.

FIG. 10 is a timing diagram illustrating an error condition which could occur during slow-motion replay. This possible error condition arises from the fact that the field store selected by the write enable devices depends on the state of the write request output of the store control PROM 250 at the time that a general field transition clocking pulse is received for that channel. Where one channel changes from tracks of one field to the next field during slow-motion replay, it may be that the other channel will not register that change until (say) the next replayed track. In such an event, the write request output of the store control PROM 250 may have stepped on in between detection of the transition by one channel and detection of the same transition by the other channel. This forces the second channel to write to the wrong store (the store number will be in error by 2).

The solution to this problem in this embodiment is provided by the write request register 260 which delays the write request signal and ensures that both channels have the same write request value. The write request register is clocked by an exclusive-OR combination of the field increment signal from the field increment processor 180 and the field decrement signal from the field decrement processor 190. Each time the write request register 260 is clocked, its output changes to that of the current write request output of the store control PROM 250. This output is held by the write request register 260 until it is next clocked. Since the field increment processor 160 and the field decrement processor 190 operate to eliminate spurious multiple detections of the same transition, the use of these signals to clock the write request register 260 means that the write request output supplied to the write enable devices changes when the first of the two channels detects a particular field transition and is then held while the second of the two channels detects that same field transition.

Figure 11:
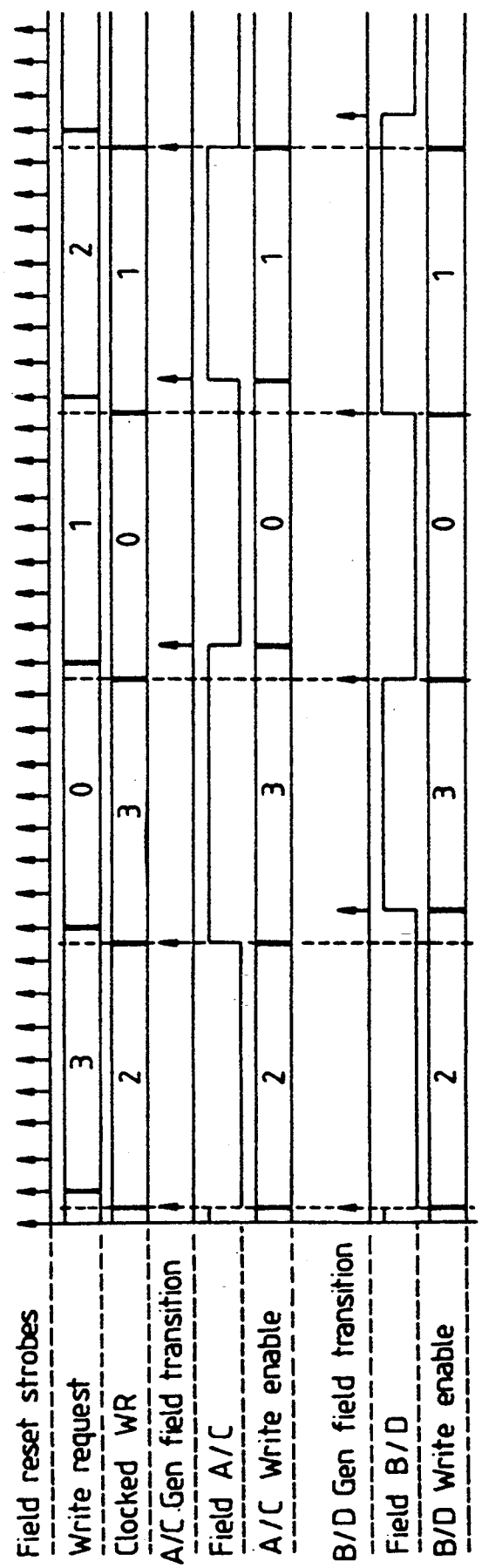
FIG. 11 is a timing diagram illustrating the operation of a write request register to prevent the error condition illustrated in FIG. 10.

The result of the use of the write request register 260 is illustrated in FIG. 11, which is a timing diagram illustrating the operation of the write request register to prevent the error condition described above. When the first of the two channels detects a particular field transition (indicated by the field increment or field decrement signal as appropriate), the write request register 260 holds the value of the write request signal (a 'clocked WR' signal) until the first of the two channels detects the next transition. This ensures that for a particular transition, the two channels receive the same value of the write request signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A video replay store controller comprising:
   means for receiving video data replayed from successive data tracks on a storage medium by a plurality of separate video replay heads, said video data comprising successive data blocks, each of said data blocks including a field identifier for indicating a field polarity for the respective data block;
   means for separately storing the field identifiers of the data blocks replayed by said separate video replay heads, respectively;
   transition detecting means supplied with said field identifiers for detecting changes in the field polarity indicated by the separately stored field identifiers included in the consecutively replayed data blocks from said respective separate video replay heads, thereby detecting a field transition in the consecutive data blocks replayed by said respective separate video replay heads for avoiding detections of erroneous field transitions when at least two of said separate video replay heads simultaneously replay data blocks from different tracks of said successive data tracks;
   a plurality of field stores; and
   selecting means responsive to the detected field transitions for selecting at least one of said plurality of field stores for storing the replayed data blocks.

2. The video replay store controller according to claim 1, wherein said field increment indicates an odd to even field polarity change in said consecutively replayed data blocks and said field decrement indicates an even to odd field polarity change in said consecutively replayed data blocks, thereby detecting a temporal order of video fields represented by said replayed data blocks.

3. The video replay store controller according to claim 1, wherein said plurality of field stores comprises four field stores.

4. The video replay store controller according to claim 1, in which said selecting means comprises:

write store selecting means for selecting, according to a cyclic access sequence, respective ones of said plurality of field stores for storing data representing successive video fields replayed from said storage medium; and read store selecting means for selecting, according to said cyclic access sequence, respective ones of said plurality of field stores for reading data representing successive stored video fields for output.

5. The video replay store controller according to claim 4, in which said write store selecting means and said read store selecting means cycle through said cyclic access sequence in response to detected field transitions in said replayed data blocks.

6. The video replay store controller according to claim 4, comprising means for receiving an output clocking signal comprising successive clocking pulses, each clocking pulse being associated with the reading of data representing a video field from a field store selected by said read store selecting means.

7. The video replay store controller according to claim 6, comprising shuttle detecting means for detecting whether more than one field transition is detected in said replayed data blocks between consecutive clocking pulses of said output clocking signal, thereby detecting shuttle replay of said replayed data blocks.

8. The video replay store controller according to claim 7, in which said shuttle detecting means comprises means for supplying an output signal indicating that said shuttle replay has been detected, and an output latch for latching said output signal for a predetermined period after said shuttle replay has ceased to be detected.

9. The video replay store controller according to claim 6, comprising:
slow-motion detecting means for detecting whether field transitions in said replayed data blocks are detected less frequently than clocking pulses of said output clocking signal, thereby detecting slow-motion replay of said replayed data blocks.

10. The video replay store controller according to claim 4, comprising:
means for controlling writing of replayed data blocks, of the same field polarity as a current video field for output, to a field store selected by said write store selecting means, and for controlling writing of replayed data blocks of an opposite field polarity to that of the current video field for output to said field store following, in said cyclic access sequence, said field store selected by said write store selecting means.

11. The video replay store controller according to claim 7, comprising:
means for controlling writing of replayed data blocks, of either field polarity, to a field store selected by said write store selecting means and to said field store following, in said cyclic access sequence, said field store selected by said write store selecting means, during said shuttle replay.

12. The video replay store controller according to claim 4, wherein said means for receiving comprises a plurality of replay channels, each replay channel comprising a time-multiplexed combination of data replayed from said plurality of separate video replay heads; and
wherein said write store selecting means comprises write store requesting means for selecting a field store according to said cyclic access sequence, and a plurality of write store enabling means associated with said plurality of replay channels, each responsive to said field store selected by said write store requesting means for controlling writing of replayed video data from a respective channel to one of said field stores.

13. The video replay store controller according to claim 12, comprising means for latching a field store selection made by said write store requesting means between successive detected field transitions.

14. The video replay store controller according to claim 4, wherein said selecting means further comprises a programmable read only memory (PROM) for controlling said write store selecting means and said read store selecting means, said PROM being supplied with address input signals for generating a plurality of data output signals, said address input signals including:
a signal indicative of shuttle replay;
signals indicative of field increments and field decrements in said replayed data blocks;
a feedback signal indicative of forward or reverse temporal order of said replayed video field;
a feedback signal indicative of a slow-motion replay;
a signal indicative of a field polarity of a current video field for output; and
feedback signals indicative of a field store currently selected for storing replayed data blocks;
and said plurality of data output signals including:
said feedback signal indicative of forward or reverse temporal order of said replayed video fields;
a signal indicative of a field store currently selected for reading video fields for output;
a signal indicative of a field store currently selected for storing replayed data blocks;
a signal for preventing storing of replayed data blocks in said field store currently selected for storing replayed data blocks, in a case that the same field store is selected for storing replayed data blocks and for reading data for output;
said feedback signal indicative of slow-motion replay; and
a signal for marking as erroneous data blocks read from a field store selected by said read store selecting means immediately after a change in said temporal order of video fields represented by said replayed data blocks.

15. A video replay store controller comprising:
means for receiving video data replayed from successive data tracks on a storage medium by a plurality of separate video replay heads, said video data comprising successive data blocks, each of said data blocks including a field identifier for indicating a field polarity for the respective data block;
transition detecting means supplied with said field identifiers, including means for detecting changes in the field polarity indicated by said field identifiers included in data blocks replayed by said separate video replay heads to produce field transitions indicating one of a field increment or field decrement change in said data blocks, and means for discarding a current field transition indicating the same field polarity increment or decrement change as the previous field transition so as to avoid detections of erroneous fields transitions;
a plurality of field stores; and
selecting means responsive to the detected field transitions for selecting at least one of said plurality of field stores for storing the replayed data blocks.

16. Video replay apparatus comprising:

means for replaying data representing successive video fields from successive data tracks on a storage medium by a plurality of separate video replay heads, said video fields comprising successive data blocks, each of said data blocks including a field identifier for indicating a field polarity for the respective data block;

means for separately storing the field identifiers of the data blocks replayed by said separate video replay heads, respectively;

transition detecting means supplied with the separately stored field identifiers for detecting changes in the field polarity indicated by said field identifiers included in the consecutively replayed data blocks from said respective separate video replay heads, thereby detecting a field transition in the consecutive data blocks replayed by said respective separate video replay heads for avoiding detections of erroneous field transitions when at least two of said separate video replay heads simultaneously replay data blocks from different tracks of said successive data tracks;

a plurality of field stored; and selecting means responsive to the detected field transitions for selecting at least one of said plurality of field stores for storing the replayed data blocks.

17. A method of controlling a video replay store, said method comprising the steps of:

receiving video data replayed from successive data tracks on a storage medium by a plurality of separate video replay heads, said video data comprising successive data blocks, each of said data blocks including a field identifier for indicating a field polarity for the respective data block;

separately storing the field identifiers of the data blocks replayed by said separate video replay heads, respectively;

detecting changes in the field polarity indicated by the separately stored field identifiers included in the consecutively replayed data blocks from said respective separate video replay heads, thereby detecting a field transition in the consecutive data blocks replayed by said respective separate video replay heads for avoiding detections of erroneous field transitions when at least two of said separate video replay heads simultaneously replay data blocks from different tracks of said successive data tracks; and selecting, on the basis of the detected field transitions, at least one of a plurality of field stores for storing the replayed data blocks.

* * * * *